March 14, 1944.          D. J. NEALE          2,344,052
SLACK PULLER
Filed Dec. 5, 1941

INVENTOR
Dory J. Neale.
BY Arthur C. Brown
ATTORNEY

Patented Mar. 14, 1944

2,344,052

UNITED STATES PATENT OFFICE 2,344,052

SLACK PULLER

Dory J. Neale, Topeka, Kans.

Application December 5, 1941, Serial No. 421,827

2 Claims. (Cl. 24—71.1)

This invention relates to slack pullers particularly for drawing slack in a telephone cable or the like incidental to repair thereof, and has for its principal object to provide a device of this character of simple, inexpensive construction and adapted to pull the desired amount of slack without injuring the cable or cable-supporting strand.

Other objects of the invention are to provide a slack puller that is readily applied to a cable-supporting strand and quickly operated; to provide a slack puller which is applicable to a cable-carrying strand which closely engages the cable as in the instance of a cable lashed to the strand; to provide a slack puller constructed to facilitate removal and replacement of worn parts; and to provide a slack puller wherein the bight in the cable-carrying strand is projected from the device thereby effecting greater slack with a given sized device.

In accomplishing these and other objects of the invention, I have provided improved details of structure, the preferred form of which is illustrated in the accompanying drawing, wherein.

Figure 1:
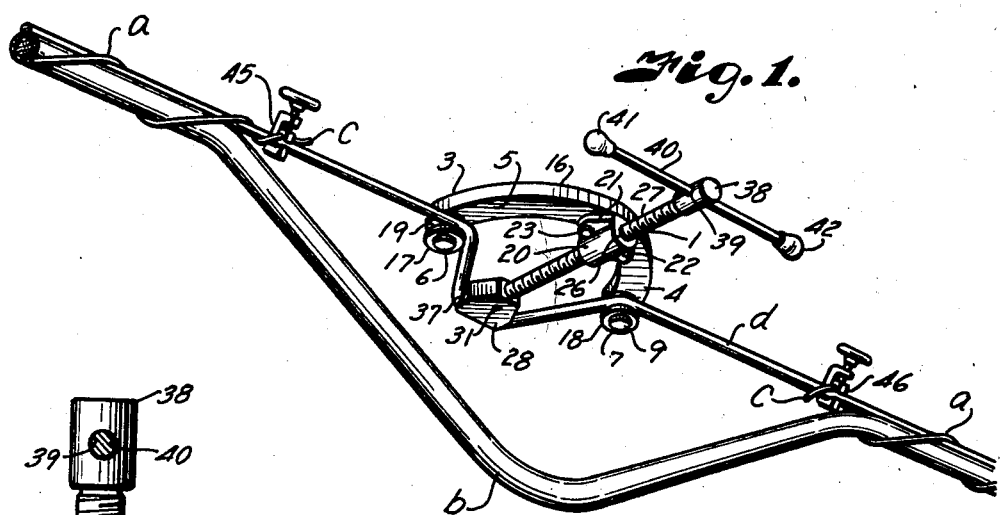
Fig. 1 is a perspective view of a slack puller applied on a cable-carrying strand and adjusted for effecting slack in the cable carried thereby.
Figure 2:
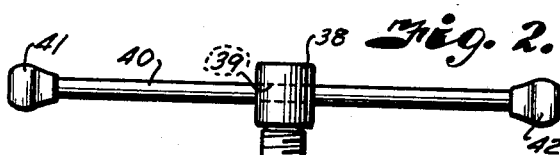
Fig. 2 is an enlarged elevational view of the slack puller, a part of the jack screw shoe being broken away and shown in section to illustrate the cable-seating groove therein.
Figure 3:
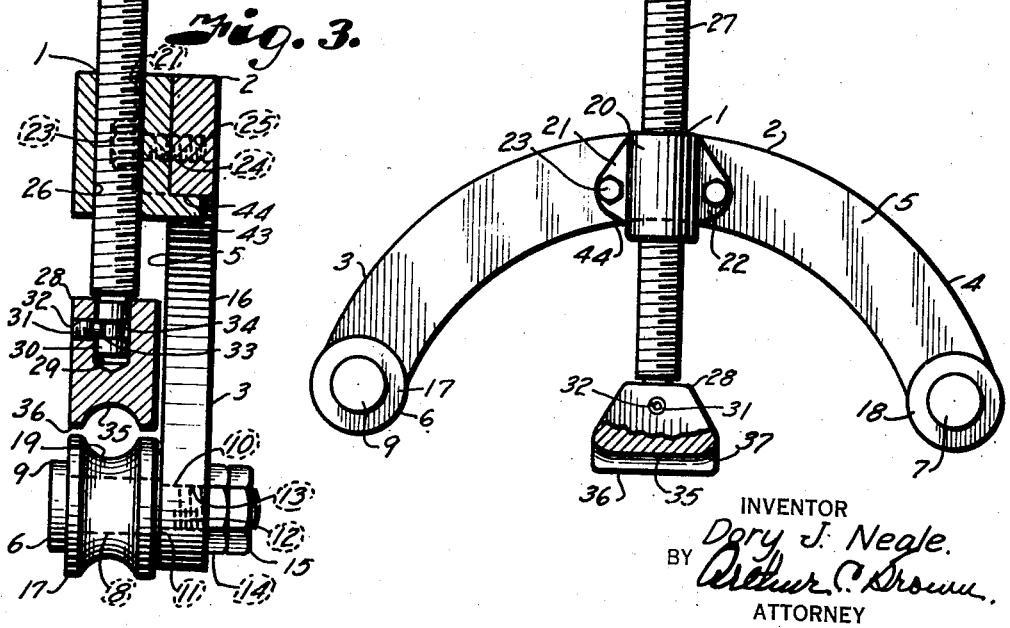
Fig. 3 is a central longitudinal section through the slack puller, the jack screw being shown in elevation.

Referring more in detail to the drawing:

1 designates a slack puller constructed in accordance with the present invention, and which includes a substantially arch-shaped member 2 having diverging ends or legs 3 and 4 and provided with a flat face 5, the ends carrying spindles 6 and 7 extending laterally from the face 5. The spindles 6 and 7 each includes a bearing portion 8, a head 9 and a reduced shank 10 forming an annular shoulder 11 with the bearing portion 8. The shank 10 is threaded as at 12 and projects through openings 13 at the ends of the respective legs, the openings being of suitable diameter that the shanks fit closely therein. The annular shoulders 11 are drawn into engagement with the face 5 of the legs by jam-nuts 14 and 15 that are threaded on the shanks 10 and which engage the opposite face 16 of the legs, as shown in Fig. 3.

The bearing portions 8, the heads 9 and face 5 of the legs of the arch journally retain rollers 17 and 18 having grooved peripheries 19 to seat a cable-carrying strand therein as later described. Fixed to the face 5 of the arch member from which the spindles project and at the center thereof is a bearing 20 preferably of bronze or similar tough, long wearing material and having laterally extending wings 21 and 22 which are clamped against the face 5 of the arch by fastening devices, such as bolts 23, extending through suitable openings 24 in the wings and into threaded sockets 25 of the arch member as shown in dotted lines, Fig. 3.

Formed axially of the bearing 20 is an internally threaded bore 26 journalling an externally threaded shaft 27 that is rotatable therein to effect movement of a strand-engaging shoe 28 relative to the grooved rollers 17 and 18. The shoe 28 may also be formed of bronze and has a socket 29 receiving a reduced end 30 of the screw shaft and is secured thereon by a fastening device 31 which is threaded into an opening 32 in the side of the shoe and has a pintle 33 engaging in an annular groove 34 in the reduced extension, so as to allow the shoe to swivel but to retain the shoe from displacement. The shoe has a groove 35 extending across the face 36 thereof to cooperate with the grooves 19 of the rollers 17 and 18 in engaging a cable-supporting strand. The ends of the groove are preferably rounded, as indicated at 37, so as to avoid injury to the strand. The opposite end of the threaded shaft carries a head 38 having an opening 39 therethrough passing a handle bar 40. The handle bar 40 carries knobs 41 and 42 to retain the bar in the head and facilitate rotation of the threaded shaft when drawing slack in a cable, later described. The handle bar is mounted loosely within the head 38 so that it may slide therein to increase the leverage which is applied to the threaded shaft. In order to relieve shearing action on the fastening devices 23, the bearing 20 is provided with a laterally extending lug 43 engaging under the inner, arcuate face 44 of the arch member, as best shown in Fig. 3.

In using the slack puller constructed and assembled as described on spun cables or cables lashed to a supporting strand, the lashing wire *a* is cut at the point where slack is to be drawn into the cable *b* and the ends *c* are anchored to the cable-carrying strand *d* by suitable clamps as indicated at 45 and 46. The slack puller is then applied to the cable-carrying strand so that the arch is in substantially horizontal position with the face 5 thereof engaging over the strand $d$ as shown in Fig. 1, with the strand $d$ extending between the rollers 17 and 18 and the shoe 28, in which position the strand extends substantially in a straight line through the puller. The bar 40 is then actuated to rotate the threaded shaft to project the shoe 28 against the cable-carrying strand so as to draw a bight over the rollers 17 and 18 as shown in Fig. 1. The threaded shaft is tightened until a sufficient amount of slack has been drawn into the cable 41, whereupon the puller is left on the carrying strand while the cable is being repaired. Since the rollers turn on the spindles there is no slipping or sliding of the strand that would cause damage thereto or wearing away of the galvanized coating thereon.

From the foregoing it is obvious that I have provided a cable puller that is of simple and inexpensive construction and because of the fact that the strand-engaging shoe is projected in the direction of the guide rollers to effect a bight in the cable, a larger bight can be produced with a small size slack puller so as to draw the desired slack in the telephone cable. Moreover, no part of the puller is in the way of the operations to be carried out on the slack portion of the cable.

It is also obvious that should the threads in the bearing 20 become worn it may be readily removed by taking out the fastening devices 23, applying a new bearing, and reinserting the fastening devices. The grooved rollers as well as the longitudinal groove of the shoe and rounded ends thereof prevent injury to the cable-carrying strand where the bight effected therein bends over the rollers and ends of the shoe as shown in Fig. 1.

What I claim and desire to secure by Letters Patent is:

1. A device for drawing slack in a cable lashed to a supporting strand including, an arch-shaped member having a substantially flat side face and diverging ends, spindles carried by said ends and projecting laterally from said side face, grooved rollers journalled upon the spindles to engage a cable supporting strand intermediate a space from which the cable lashing wire has been removed, an internally threaded bearing carried by said member on the same side thereof as the rollers and intermediate said ends, a threaded shaft engaging the threads of the bearing, a strand-engaging shoe swivelled on said shaft and having a grooved face adapted to engage the side of the strand opposite that engaged by the rollers, and means on said shaft for rotating the shaft to project a bight in said strand to draw slack in the cable, said bight of the strand applying a force on the rollers substantially parallel with the ends of the arch-shaped member, thereby placing the arch-shaped member in tension.

2. A device for drawing slack in a cable lashed to a supporting strand including, an arch-shaped member having a substantially flat side face and diverging ends, spindles carried by said ends and projecting laterally from said side face, grooved rollers journalled upon the spindles to engage a cable supporting strand intermediate a space from which the cable lashing wire has been removed, an internally threaded bearing having laterally extending wings engaging said side face of the member intermediate said ends, fastening devices removably anchoring the wings to said member, a threaded shaft engaging the threads of the bearing, a strand engaging shoe swivelled on the threaded shaft and having a grooved face adapted to engage the side of the strand opposite that engaged by the rollers, a cross-bar on said shaft for rotating the screw to project a bight in said strand to apply slack in the cable, said bight of the strand applying a force on the rollers substantially parallel with the ends of the arch-shaped member thereby placing said arch-shaped member in tension, and a lug on the bearing engaging the inner face of the arch-shaped member for relieving said fastening devices from actual thrust of the threaded shaft.

DORY J. NEALE.